Nov. 28, 1961   T. T. FELL ET AL   3,011,166
PULSE DOPPLER RADAR SYSTEM
Filed Aug. 29, 1956   2 Sheets-Sheet 2

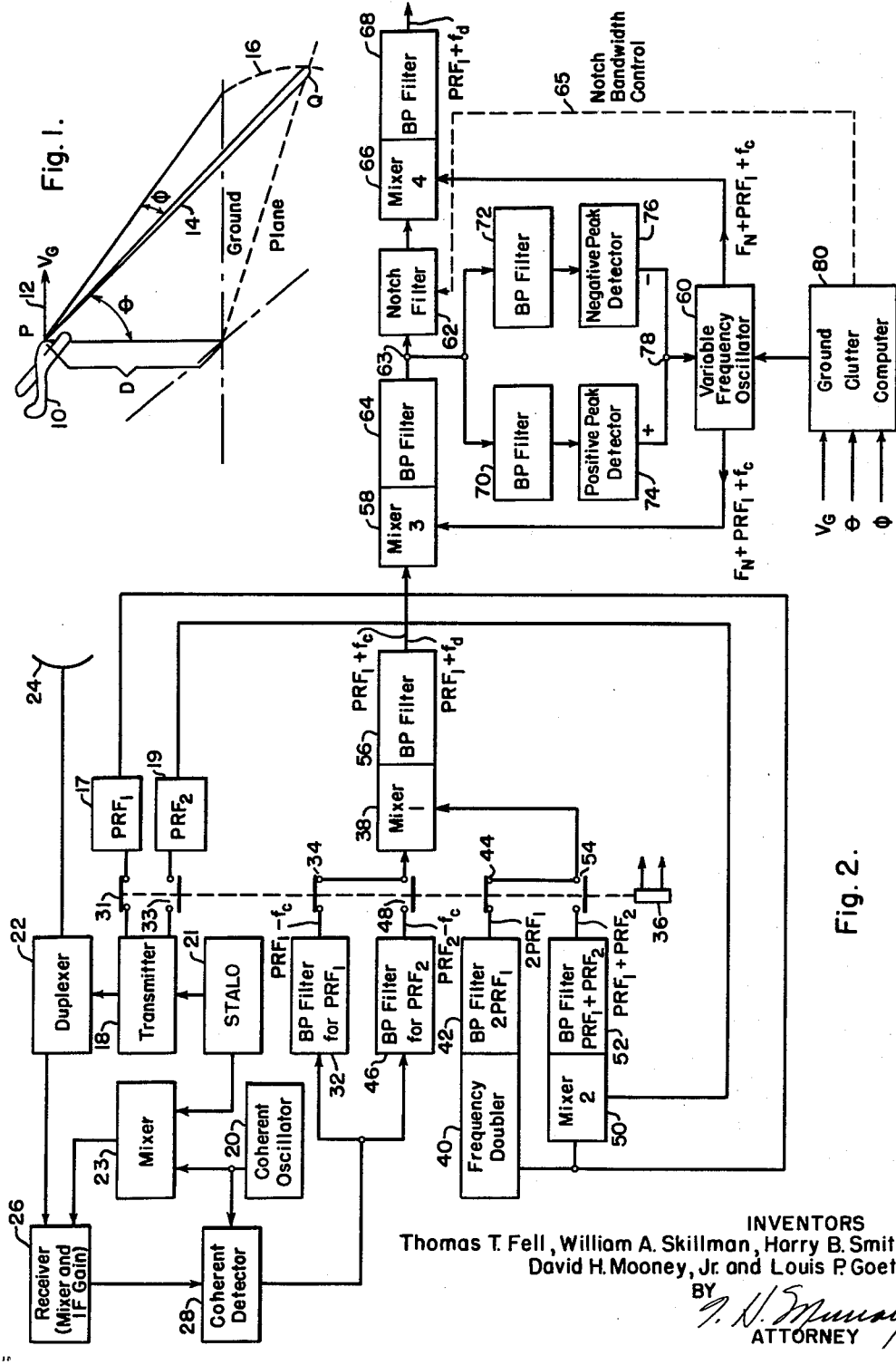

3,011,166
PULSE DOPPLER RADAR SYSTEM
Thomas T. Fell, Middle River, William A. Skillman, Arbutus, David H. Mooney, Jr., Glen Burnie, Harry B. Smith, Catonsville, and Louis P. Goetz, Linthicum, Md., assignors to Westinghouse Electric Corporation, East Pittsburgh, Pa., a corporation of Pennsylvania
Filed Aug. 29, 1956, Ser. No. 607,541
14 Claims. (Cl. 343—7.7)

This invention relates to pulse Doppler radar systems and more particularly to means in an airborne pulse Doppler radar system for distinguishing between moving and stationary targets by frequency discrimination.

When a pulse Doppler radar system is mounted on a moving aircraft, the Doppler shift of the radar returns received from the ground at any instant is generally different from that of the returns from moving targets such as other aircraft. In order to avoid confusion between true moving target returns and those received from the ground, it is necessary to eliminate the signals received from the ground (i.e. ground clutter) and pass only the true target returns to the detection and tracking portion of the radar system. The problem is complicated to a great degree when the antenna on the aircraft scans in azimuth and elevation since, under these circumstances, the Doppler shift of ground returns is constantly changing as the antenna scans. Although the ground return signals could be attenuated by straight-forward filtering techniques, a filter with a rejection bandwidth wide enough to accommodate all possible Doppler frequencies reflected from the ground would greatly reduce the pass bandwidth which could be used for target returns from moving targets, thereby limiting the performance of the system to targets traveling in a small band of velocities.

It is a primary object of this invention to provide means in a pulse Doppler radar system for eliminating signals which are returned from targets having predetermined velocity relative to the radar system.

More specifically, an object of the invention is to provide means in an airborne pulse Doppler radar system for filtering out a varying, narrow band of ground return signals as the antenna of the system scans.

A still further object of the invention is to provide means for filtering out ground return signals in a scanning airborne pulse Doppler radar system employing multiple values of the pulse repetition frequency.

The above and other objects and features of the invention will become apparent from the following detailed description taken in connection with the accompanying drawings which form a part of the specification and in which:

FIGURE 1 is an illustration of the angular and spacial relationships existing between an aircraft, the ground and the radar beam projected from a scanning antenna mounted on the aircraft;

FIG. 2 is a block diagram illustrating the present invention as applied to a pulse Doppler radar system employing multiple values of the pulse repetition frequency;

Figure 3A:
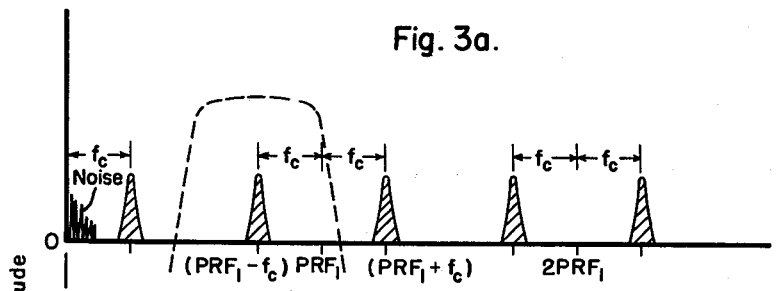
FIGS. 3a and 3b are illustrations of the frequency spectrums of signals received by the system shown in FIG. 2.

Referring to FIG. 1, an aircraft 10 traveling with velocity $V_G$ in the direction of arrow 12 at a distance D above the ground has a scanning antenna mounted on its nose which projects a radar beam, generally indicated at 14. As the antenna and beam 14 scan in azimuth, the focus of points at which beam 14 strikes the ground defines an arc, generally indicated at 16. Since the altitude and velocity of the aircraft may change, and since the azimuth angle $\phi$ and elevation angle $\theta$ of the radar beam are constantly changing, the velocity of point P relative to point Q (at which the radar beam 14 strikes the ground) is always changing. The present invention, as hereinafter described, is designed to eliminate the band of frequencies produced at any instant by signals reflected from the ground.

The embodiment of the system shown in FIG. 2 is designed specifically for a multiple PRF pulse Doppler radar system as shown and described in copending application Serial No. 570,444, filed March 9, 1956 and assigned to the assignee of the present application. In the system described in the aforementioned application, two values of the transmitted pulse repetition frequency are employed which have a common submultiple. Initially, when the radar antenna is searching for a target, the first pulse repetition frequency is used. When a target is detected in the searching process, the antenna pauses; and at the same time a tracking gate is produced which, in effect, is a train of voltage pulses having the same pulse repetition frequency and phase position as the target returns at the first pulse repetition frequency. The relative position of this gate is stored in a memory circuit by means of a direct current voltage. Then, the frequency of the transmitted pulses is shifted to a second pulse repetition frequency, and a second tracking gate is produced and its position is stored in a memory circuit. If the two tracking gate trains are passed through a coincidence gate they will coincide periodically and produce an output pulse. These output pulses are then compared in phase with a series of pulses having a pulse repetition frequency equal to the difference between the first and second pulse repetition frequencies to produce the direct current output voltage which is proportional to range.

In FIG. 2 it can be seen that a transmitter 18, supplied with radio frequency energy from a stalo oscillator 21, feeds pulses of radio frequency energy to duplexer 22 and then to antenna 24. The transmitter 18 is keyed on with pulsed energy from one of two pulse generators 17 or 19. When the pulses of RF energy from transmitter 18 initially strike a distant object, they will be reflected back to antenna 24 and directed through duplexer 22 to a receiver 26. In receiver 26 the received RF pulses are mixed with the output of mixer 23 and fed as an IF signal to a coherent detector 28. Mixer 23 supplies the necessary RF local oscillator signal as the sum of stalo 21 and coherent oscillator 20 frequencies. Essentially, the coherent detector is another mixer which produces the Doppler information as amplitude modulation of video pulses.

As above stated, pulses are transmitted from the radar system at one of two pulse repetition frequencies which will be called $PRF_1$ and $PRF_2$. Assuming that contacts 31 of relay 36 are closed and that the pulses from generator 17 are transmitted at frequency $PRF_1$, then the received signal passes through a band-pass filter 32 and the normally closed contacts 34 of the relay 36 to a mixer 38. At this time a CW signal of frequency $PRF_1$ from generator 17, fed to frequency doubler 40 and band-pass filter 42, is applied through normally closed contacts 44 of relay 36 to mixer 38. When relay 36 is energized by circuitry, not shown, contacts 33 of relay 36 will be closed and the frequency of the transmitted pulses changes to $PRF_2$. Consequently, the received signal passing through coherent detector 28 of frequency $PRF_2$ will pass through band-pass filter 46 and the normally open contacts 48 of relay 36 to mixer 38. But now, a CW signal having a frequency of $PRF_1$ from generator 17 and a CW signal of frequency $PRF_2$ from generator 19 are fed to mixer 50 which produces a sum frequency output signal of $PRF_1 + PRF_2$, which passes through band-pass filter 52 and normally open contacts 54 of relay 36 to mixer 38.

Figure 3B:
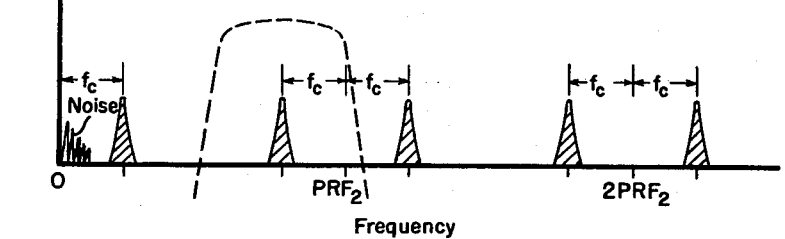

In explaining the function of mixer 38 the nature of the video spectrum of received signals at the output of coherent detector 28 should now be reviewed. The spectrum of received ground echoes at frequency $PRF_1$ resembles at its lower end that shown in FIG. 3a. In order to avoid low frequency noise illustrated in FIG. 3a and FIG. 3b (such as power supply hum and microphonics), it is desirable to pass the video pulses through a filter such as filter 32 or 46 to select one sideband range of the first PRF spectral line as shown in FIG. 3a by the dotted line. The problem now is to locate the ground clutter returns (shown by the shaded portions) and suppress the spread of frequencies which results from the finite bandwidth intersecting with the ground. When the frequency of the transmitted pulses is shifted to $PRF_2$, the video spectrum of the received ground echoes resembles that shown in FIG. 3b. When the shift is made to the second PRF, all spectral sidebands of the clutter, other than the initial sideband, jump to the right accordingly. Consequently, filter 32 must be replaced with filter 46, which has a pass band that is displaced to the right accordingly (as shown by the dotted lines in FIGS. 3a and 3b).

Assuming that the first pulse repetition frequency is being used and the contacts of relay 36 are in the positions shown, the signal passing through band-pass filter 32 will be at a frequency equal to $PRF_1-f_c$ where $f_c$ is the Doppler shift in frequency experienced by the signals reflected from the ground; or it will be at a frequency equal to $PRF_1-f_d$ where $f_d$ is a Doppler shift in frequency experienced by signals which strike moving targets.

The signal of $PRF_1$ applied to frequency doubler 40 and band-pass filter 42 will have a frequency equal to $2PRF_1$. Mixer 38 produces an output difference frequency. Consequently, if the target returns are from moving targets, the output frequency from mixer 38 will be $$2PRF_1-(PRF_1-f_d)=PRF_1+f_d$$

However, if the target returns are from the ground, then the output of mixer 38 will be $$2PRF_1-(PRF_1-f_c)=PRF_1+f_c$$

Similarly, when the second pulse repetition frequency $PRF_2$ is in use, the clutter energy from stationary objects appears at $PRF-f_c$; whereas the energy from moving targets appears at $PRF_2-f_d$. When either of these signals are mixed with a signal of $PRF_1+PRF_2$ from mixer 50 and its sum-frequency filter 52, the resultant clutter signal selected at the output of mixer 38 is again the difference frequency $$(PRF_1+PRF_2)-(PRF_2-f_c)=PRF_1+f_c$$

Likewise, the resultant signal from a moving target at the output of mixer 38 is equal to $$(PRF_1+PRF_2)-(PRF_2-f_d)=PRF_1+f_d$$

It can thus be seen that the signal at the output of mixer 38 is unaffected by pulse repetition frequency switching by virtue of the fact that different signals are mixed with the respective target returns at the two pulse repetition frequencies.

The difference frequency output signal from mixer 38 is passed through a band-pass filter 56 to another mixer 58. In mixer 58 the signal of $PRF_1+f_d$ or $PRF_1+f_c$ is mixed with a signal from variable frequency oscillator 60 having a frequency equal to $PRF_1+f_c+F_N$ where $F_N$ is the center frequency of a band rejection filter 62. Band-pass filter 64 selects the difference frequency output of mixer 58 so that if a signal of $PRF_1+f_c$ (ground return signal) arrives at mixer 58, the output of filter 64 will be equal to $$(PRF_1+f_c+F_N)-(PRF_1+f_c)=F_N$$

This signal, then, is attenuated in band rejection filter 62 which is tuned to the frequency $F_N$. However, if a signal from a moving target of frequency $PRF_1+f_d$ arrives at mixer 68, the output of the mixer and filter 64 will be $$(PRF_1+f_c+F_N)-(PRF_1-f_d)=F_N+f_c-f_d$$

If the target is not obscured by clutter ($f_c=f_d$), this signal does not fall within the rejection band of filter 62 and will pass to mixer 66 where it is again mixed with a signal of frequency $PRF_1+f_c+F_N$. Mixer 66 produces a difference output frequency which is selected by band-pass filter 68. Consequently, the moving target signal appearing at the output of band-pass filter 68 will be $$(F_N+PRF_1+f_c)-(F_N+f_c-f_d)=PRF_1+f_d$$

It can be seen, therefore, that a signal received from a true moving target is translated back to its original frequency and passed to other circuitry in the radar system.

Figure 4A:
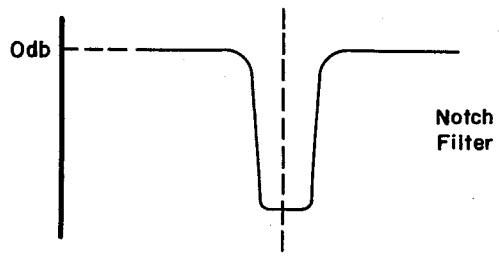
FIGS. 4a and 4b are illustrations of the response curves of the band rejection and band-pass filters, respectively, employed in the circuit of FIG. 2.
Figure 4B:
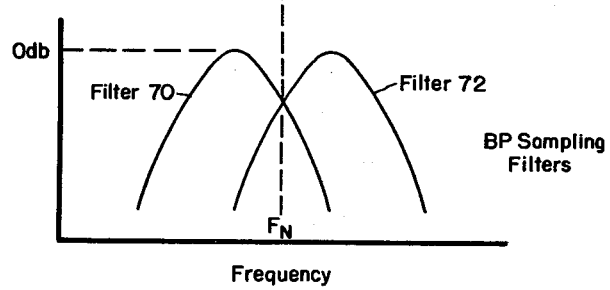

In order to monitor the clutter in frequency and determine on which side of the rejection band of filter 62 the maximum clutter energy resides a control system, responsive to the output of band-pass filter 64, is provided for control of variable frequency oscillator 60. As shown, this control system comprises a pair of parallel signal channels, each containing a band-pass filter 70 or 72 and a peak detector 74 or 76 for detecting the output of the band-pass filters. The output of the positive peak detector 74 and the negative peak detector 76 are then added at point 78 and fed to variable frequency oscillator 60 as a control voltage. The band pass of filters 70 and 72 with respect to the rejection band of filter 62 is shown in FIGS. 4a and 4b. It can be seen in FIG. 4b that the band passes of filters 70 and 72 lie on each side of the rejection band of filter 62 as shown in FIGURE 4a. Consequently, when the translated clutter frequency at point 63 tends to shift slightly above the frequency $F_N$, the signal will pass through band-pass filter 72 and negative peak detector 76 to lower the output frequency of variable frequency oscillator 60, which in turn translates the clutter frequency back down to $F_N$ (the center notch of filter 62). Likewise, if the translated clutter frequency tends to shift below the frequency $F_N$, then the signal will pass through band-pass filter 70 and positive peak detector 74 to increase the frequency of the variable frequency oscillator 60, increasing the frequency of clutter energy to fall in the center notch of filter 62.

It can readily be seen that the operation of the system shown in FIG. 2 depends upon the initial value of the frequency component $f_c$ in the output of variable frequency oscillator 60, neglecting the correction derived by filters 70 and 72. As the clutter frequency $f_c$ varies when the aircraft speed changes and the azimuth angle of the antenna changes, the frequency output of variable frequency oscillator 60 must change also. To this end a ground clutter computer 80 is provided. This computer is an analog device for computing the relative velocity of the antenna on the nose of the aircraft shown in FIG. 1 with respect to point Q. As shown, the computation is a simple geometrical problem to give $V_D$ as a function of $V_G$ and with $\phi$ where $V_D$=the relative or Doppler velocity
$V_G$=ground speed
$\theta$=antenna elevation angle, and
$\phi$=antenna azimuth angle The purpose of the ground clutter computer 80 is, then, to initially set the variable frequency oscillator 60 at a value which will heterodyne (by mixer 58) the clutter frequency down to the immediate vicinity of $F_N$, the center frequency of notch filter 62. Once in this vicinity, the action of the band-pass filters 70 and 72 with peak detectors 74 and 76 provides a final correction of the variable frequency oscillator to accurately pull the clutter energy into the center of the rejection band of notch filter 62.

A further function of ground clutter computer 80 is to select an appropriate rejection bandwidth of the notch filter 62. The bandwidth of ground clutter returns is proportional to the aircraft's ground speed with antenna azimuth angle held fixed. With changes in azimuth angle, there is an additional variation of bandwidth of clutter signal. A mechanization can be incorporated into the system for permitting the ground clutter computer 80 to select a rejection band of appropriate width in discrete steps since a computation of approximate bandwidth can be made from the variables fed into the computer. Such control of notch filter 62 is indicated by the dashed line 65 of FIGURE 2. In this arrangement an appropriate one of a plurality of parallel notch filters is switched into the circuit by means such as a series of relays actuated at predetermined voltage levels which are proportional to antenna scan angle as corrected for aircraft speed and elevation angle. The advantage of such an arrangement is that it is possible to search in velocity for targets which lie close to the clutter signal frequency since the notch filter varies in bandwidth to reject as small a bandwidth of frequencies as possible.

Although the invention has been shown in connection with a certain specific embodiment, it will be readily apparent to those skilled in the art that various changes in form and arrangement of parts can be made to suit requirements without departing from the spirit and scope of the invention.

We claim as our invention:

1. In a pulse Doppler radar system adapted to receive pulses of radio frequency energy reflected from a distant object at a pulse repetition frequency $PRF_1$, the combination of first means for mixing radio frequency energy with said received pulses to produce an output difference frequency signal having a frequency equal to $PRF_1$ minus a Doppler shift in frequency $f_d$ produced by a moving target or $PRF_1$ minus a Doppler shift in frequency $f_c$ produced by a stationary target, a source of signals having a frequency equal to $2PRF_1$, second means for mixing the signal of frequency $2PRF_1$ with the output of said first mixing means to produce a signal having a frequency equal to $PRF_1+f_d$ if the received pulses are reflected from a moving target or a frequency equal to $PRF_1+f_c$ if the received pulses are reflected from a stationary target, a source of signal voltage having a frequency equal to $PRF_1+f_c+F_n$ where $F_n$ is some predetermined frequency, third means for mixing said source of signal voltage with the output of said second mixing means to produce a difference frequency signal of $F_n$ if the received pulses are reflected from a stationary target or a difference frequency signal of $F_n+f_c-f_d$ if the received pulses are reflected from a moving target, a band rejection filter tuned to the frequency $F_n$, means for passing the output of said third mixing means through said filter whereby signals of frequency $F_n$ produced by pulses reflected from stationary targets will be attenuated, and fourth means for mixing the output of said filter with said source of signal voltage.

2. In a pulse Doppler radar system adapted to receive pulses of radio frequency energy reflected from a distant object at a pulse repetition frequency $PRF_1$, the combination of first means for mixing radio frequency energy with said received pulses to produce an output difference frequency signal having a frequency equal to $PRF_1$ minus a Doppler shift in frequency $f_d$ produced by a moving target or $PRF_1$ minus a Doppler shift in frequency $f_c$ produced by a stationary target, a source of signals having a frequency equal to $2PRF_1$, second means for mixing the signal of frequency $2PRF_1$ with the output of said first mixing means to produce a signal having a frequency equal to $PRF_1+f_d$ if the received pulses are reflected from a moving target or a frequency equal to $PRF_1+f_c$ if the received pulses are reflected from a stationary target, a source of signal voltage having a frequency equal to $PRF_1+f_c+F_n$ where $F_n$ is some predetermined frequency, third means for mixing said source of signal voltage with the output of said second mixing means to produce a difference frequency signal of $F_n$ if the received pulses are reflected from a stationary target or a difference frequency signal of $F_n+f_c-f_d$ if the received pulses are reflected from a moving target, a band rejection filter tuned to the frequency $F_n$, means for passing the output of said third mixing means through said filter whereby signals of frequency $F_n$ produced by pulses reflected from stationary targets will be attenuated, fourth means for mixing the output of said filter with said source of signal voltage, and means responsive to the output of said third mixing means for changing the frequency of said source of signal voltage when the frequency $f_c$ changes.

3. The combination claimed in claim 2 wherein the source of signal voltage comprises a variable frequency oscillator and wherein the means for changing the frequency of said source of signal voltage comprises a pair of signal channels, a bandpass filter in each of said channels tuned respectively to a band of frequencies just above and below the rejection band of said band rejection filter, a detector in each of said channels for producing a direct current voltage when a signal passes through its associated band-pass filter, means for adding the direct current output voltages of said detectors, and means for feeding the resultant added direct current voltage to said variable frequency oscillator as a control voltage.

4. In a moving airborne pulse Doppler radar system equipped with a scanning antenna and adapted to receive pulses of radio frequency energy reflected from a distant object at a pulse repetition frequency $PRF_1$, the combination of first means for mixing radio frequency energy with said received pulses to produce an output difference frequency signal having a frequency equal to $PRF_1$ minus a Doppler shift in frequency $f_d$ produced by a moving target or $PRF_1$ minus a Doppler shift in frequency $f_c$ produced by a stationary target, a source of signals having a frequency equal to $2PRF_1$, second means for mixing the signal of frequency $2PRF_1$ with the output of said first mixing means to produce a signal having a frequency equal to $PRF_1+f_d$ if the received pulses are reflected from a moving target or a frequency equal to $PRF_1+f_c$ if the received pulses are reflected from a stationary target, a variable frequency oscillator having an output frequency equal to $PRF_1+f_c+F_n$ where $F_n$ is some predetermined frequency, third means for mixing the output of said variable frequency oscillator with the output of said second mixing means to produce a difference frequency signal $F_n$ if the received pulses are reflected from a stationary target or a difference frequency signal of $F_n+f_c-f_d$ if the received pulses are reflected from a moving target, a band rejection filter tuned to the frequency $F_n$, means for passing the output of said third mixing means through said filter whereby signals of frequency $F_n$ produced by pulses reflected from stationary targets will be attenuated, fourth means for mixing the output of said filter with said source of signal voltage, means for producing a control voltage which is proportional to a computed Doppler shift of reflected energy pulses from the ground as the said antenna scans the ground terrain, and means for feeding said control voltage to said variable frequency oscillator to vary the output frequency thereof.

5. In a pulse Doppler radar system adapted to receive pulses of radio frequency energy reflected from a distant object at one of two pulse repetition frequencies $PRF_1$ or $PRF_2$, the combination of a device for mixing radio frequency energy with said received pulses to produce an output difference frequency signal having a frequency equal to the pulse repetition frequency of received pulses minus a Doppler shift in frequency, a source of signals having a frequency equal to $2PRF_1$, a source of signals having a frequency equal to $PRF_1+PRF_2$, means for mixing said difference frequency signal produced by pulses received at $PRF_1$ with the source of signals having a frequency equal to $2PRF_1$ to produce a signal having a frequency equal to $PRF_1$ plus a Doppler shift in frequency, means for mixing the difference frequency signal produced by pulses at $PRF_2$ with the source of signals at $PRF_1+PRF_2$ to also produce a signal with a frequency equal to $PRF_1$ plus a Doppler shift in frequency, a source of signal voltage having a frequency greater than $PRF_1$, apparatus for mixing said source of signal voltage with the signal of $PRF_1$ plus a Doppler shift in frequency produced by either of the aforesaid mixing means, a band rejection filter, means for passing the output of said mixing apparatus through said filter, and means for mixing the output of said filter with said source of signal voltage.

6. In a pulse Doppler radar system adapted to receive pulses of radio frequency energy reflected from a distant object, the combination of first means for mixing radio frequency energy with said received pulses to produce an output difference frequency signal, a first source of signals, second means for mixing said first source of signals with the output of said first mixing means, a second source of signals, third means for mixing the output of said second mixing means with said second source of signals, a band rejection filter, means for passing the output of said third mixing means through said filter, and fourth means for mixing signals passing through said filter with said second source of signals.

7. In a pulse Doppler radar system adapted to receive pulses of radio frequency energy reflected from a distant object, the combination of first means for mixing radio frequency energy with said received pulses to produce an output difference frequency signal, a source of signals, second means for mixing said source of signals with the output of said first mixing means, a variable frequency oscillator, third means for mixing the output of said second mixing means with the output of said variable frequency oscillator, a band rejection filter, means for passing the output of said third mixing means through said filter, fourth means for mixing signals passing through said filter with the output of said variable frequency oscillator, means responsive to the output of said third mixing means for controlling the output frequency of said variable frequency oscillator and comprising a pair of signal channels, means for applying the output of said third mixing means to each of said channels, a band-pass filter in each of said channels tuned respectively to a band of frequencies just above and below the rejection band of said band rejection filter, a detector in each of said channels for detecting signals passing through its associated band-pass filter, and means for applying the outputs of said detectors to said variable frequency oscillator to control the output frequency thereof.

8. In a moving airborne pulse Doppler radar system equipped with a scanning antenna and adapted to receive pulses of radio frequency energy reflected from a distant object, the combination of first means for mixing radio frequency energy with said received pulses to produce an output difference frequency signal, a first source of signals, second means for mixing said source of signals with the output of said first mixing means, a variable frequency oscillator, third means for mixing the output of said second mixing means with the output of said variable frequency oscillator, a band rejection filter, means for passing the output of said third mixing means through said filter, fourth means for mixing signals passing through said filter with the output of said variable frequency oscillator, means for producing a control voltage which is proportional to the computed Doppler shift of reflected energy pulses from the ground as the said antenna scans the ground terrain, and means for feeding said control voltage to said variable frequency oscillator to vary the output frequency thereof.

9. In a moving airborne pulse Doppler radar system equipped with a scanning antenna and adapted to receive pulses of radio frequency energy reflected from a distant object, the combination of first means for mixing radio frequency energy with said received pulses to produce an output difference frequency signal, a first source of signals, second means for mixing said source of signals with the output of said first mixing means, a variable frequency oscillator, third means for mixing the output of said second mixing means with the output of said variable frequency oscillator, a band rejection filter, means for passing the output of said third mixing means through said filter, fourth means for mixing signals passing through said filter with the output of said variable frequency oscillator, means for producing a control voltage which is proportional to a computed Doppler shift of reflected energy pulses from the ground as the said antenna scans the ground terrain, means for feeding said control voltage to said variable frequency oscillator to vary the output frequency thereof, further means responsive to the output of said third mixing means for controlling the output frequency of said variable frequency oscillator and comprising a pair of signal channels, means for applying the output of said third mixing means to each of said signal channels, a band-pass filter included in each of said channels, means in each of said chanels for detecting a signal passing through its associated band-pass filter, and means for applying the outputs of said detectors to said variable frequency oscillator to control the output frequency thereof.

10. In a pulse Doppler radar system adapted to receive pulses of radio frequency energy reflected from a distant object at a pulse repetition frequency $PRF_1$, the combination of first means for mixing radio frequency energy with said received pulses to produce an output difference frequency signal having a frequency equal to $PRF_1$ minus a Doppler shift in frequency, a source of signals having a frequency equal to $2PRF_1$, second means for mixing the signal of frequency $2PRF_1$ with the output of said first mixing means to produce a signal having a frequency equal to $PRF_1$ plus a Doppler shift frequency, a source of signal voltage having a frequency greater than the frequency $PRF_1$, third means for mixing said source of signal voltage with the output of said second mixing means to produce a difference frequency signal, a band rejection filter, means for passing the output of said third mixing means through said filter, and fourth means for mixing the output of said filter with said source of signal voltage.

11. The combination claimed in claim 10 and including a band-pass filter inserted between said first and second mixing means to select one side-band range of the signal from said first mixing means.

12. The combination claimed in claim 10 wherein a band-pass filter is connected to the output of each of said mixing means.

13. In a moving airborne pulse Doppler radar system equipped with a scanning antenna and adapted to receive pulses of radio frequency energy reflected from a distant object, the combination of first means for mixing radio frequency energy with said received pulses to produce an output difference frequency signal, a first source of signals, second means for mixing said first source of signals with the output of said first mixing means, a second source of signals, third means for mixing the output of said second mixing means with said second source of signals, filter means having a rejection band which varies as a function of a control voltage applied thereto, means for passing the output of said third mixing means through said filter, means for producing a voltage which is proportional to a computed Doppler shift of reflected energy pulses from the ground as the said antenna scans, means for feeding said last-mentioned voltage to said filter means as a control voltage to vary the rejection band thereof, and fourth means for mixing signals passing through said filter means with said second source of signals.

14. In a moving airborne pulse Doppler radar system equipped with a scanning antenna and adapted to receive pulses of energy reflected from a distant object, a signal channel for said received pulses, filter means in said signal channel having a rejection band which varies as a function of a control voltage applied thereto, means for producing a voltage which is proportional to a computed Doppler shift of reflected energy pulses from the ground as the said antenna scans the ground terrain, and means for feeding said last-mentioned voltage to said filter means as a control voltage to vary the rejection band thereof.

References Cited in the file of this patent

UNITED STATES PATENTS

| | | |
|---|---|---|
| 2,621,243 | Sunstein | Dec. 9, 1952 |
| 2,739,307 | Sunstein | Mar. 20, 1956 |